(12) United States Patent
Ben-Yehuda et al.

US008490090B2

(10) Patent No.: US 8,490,090 B2
(45) Date of Patent: *Jul. 16, 2013

(54) MULTILEVEL SUPPORT IN A NESTED VIRTUALIZATION ENVIRONMENT

(75) Inventors: Shmuel Ben-Yehuda, Haifa (IL); Abel Gordon, Haifa (IL); Nadav Yosef Har'El, Misgav (IL); Ben-Ami Yassour, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/029,136

(22) Filed: Feb. 17, 2011

(65) Prior Publication Data

US 2012/0216187 A1    Aug. 23, 2012

(51) Int. Cl.
*G06F 9/455*    (2006.01)
(52) U.S. Cl.
USPC ............................................................. 718/1
(58) Field of Classification Search
None
See application file for complete search history.

(56) References Cited

U.S. PATENT DOCUMENTS

| 7,552,426 | B2 | 6/2009 | Traut | |
|---|---|---|---|---|
| 2005/0076186 | A1 | 4/2005 | Traut | |
| 2009/0193399 | A1* | 7/2009 | Mitran et al. | 717/139 |
| 2010/0125708 | A1* | 5/2010 | Hall et al. | 711/154 |
| 2010/0169882 | A1* | 7/2010 | Ben-Yehuda et al. | 718/1 |
| 2011/0072428 | A1* | 3/2011 | Day et al. | 718/1 |
| 2011/0153909 | A1* | 6/2011 | Dong | 711/6 |
| 2012/0131574 | A1* | 5/2012 | Day et al. | 718/1 |
| 2012/0191948 | A1* | 7/2012 | Day et al. | 712/205 |

FOREIGN PATENT DOCUMENTS

| FR | 2833729 | 6/2003 |
|---|---|---|
| WO | 2007027739 | 3/2007 |

OTHER PUBLICATIONS

Ben-Yehuda, Muli, "The Turtles Project: Design and Implementation of Nested Virtualization", Jan. 9, 2010, All Pages.*
Wing-Chi Poon and Aloysius K. Mok, "Bounding the Running Time of Interrupt and Exception Forwarding in Recursive Virtualization for the x86 Architecture", Technical Report VMware-TR-2010-003 Oct. 20, 2010.
Vasudevan et al., "Requirements for an integrity-protected hypervisor on the x86 hardware virtualized architecture", In Proceedings of the 3rd International Conference on Trust and Trustworthy Computing, pp. 141-165, Jun. 2010.

* cited by examiner

*Primary Examiner* — Jennifer To
*Assistant Examiner* — Bradley Teets
(74) *Attorney, Agent, or Firm* — F. Jason far-hadian; Century IP Group

(57) ABSTRACT

A method of handling an event occurring in a nested virtualization computing environment is provided, wherein N hypervisors are executed nestedly, with a first hypervisor running at level zero (L0) directly over a host machine, and other hypervisors nestedly running at levels L1 to Ln, respectively. The method comprises trapping an event generated by software running at level Ln; determining a hypervisor x at level Lx designated for handling the trapped event; and wherein the hypervisor x emulates features needed for performing the trapped event for the software running at the level Ln.

5 Claims, 9 Drawing Sheets

MULTILEVEL SUPPORT IN A NESTED VIRTUALIZATION ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The disclosed subject matter relates generally to virtualization in a computing system and, more particularly, to nested virtualized environments.

BACKGROUND

In a computing system, host software (e.g., a hypervisor) may support a simulated computing environment (e.g., a virtualized environment) by way of implementing a virtual machine (VM) for guest software running on a host machine. The VM allows the guest software to execute as if the guest software was running directly on the physical hardware of the host machine.

The host machine generally includes a processor that is configured to operate in two modes: a non-root mode and a root mode. The host machine generally operates in the non-root mode to execute the guest software's non-privileged instructions, but may switch to the root mode upon detecting a privileged instruction that is to be managed by the hypervisor. Switching between modes is commonly referred to as trapping or as caused by an event that results in the so-called trap.

In a classic virtualized environment, multiple VMs are simultaneously executed over a base hypervisor at level zero (L0), which is the software level implemented directly over the host machine. In a nested virtualized environment, the L0 hypervisor can run multiple other hypervisors having corresponding virtual machines respectively nested at each level, such that a VM at level n+1, runs over a guest hypervisor at level n; and the guest hypervisor at level n runs over a host hypervisor at level n−1. The processor architecture may only support a single hypervisor mode, wherein a trap generated at any nested level is handled by the L0 hypervisor.

Referring to FIG. 1A, for example, a nested virtualized environment is illustrated in which the L0 hypervisor handles all traps that occur as the result of execution of the guest hypervisors and the guests, at L1 and L2 respectively. That is, L0 is designated to handle all traps generated at any level regardless of the depth of the nested virtualization. FIG. 1B is an illustration of the path of execution in the nested environment of FIG. 1A, where any trap occurring at levels L1, L2, L3, . . . , Ln results in the execution path dropping to L0.

As such, if the host does not have the architectural support for nested virtualization, additional hardware or software mechanisms will have to be implemented at a cost. For example, in order to run two levels of virtualization, some hypervisors are equipped with complex software schemes called extensions which multiplex the single level of virtualization supported by the host across the nested levels by forwarding and translating the specifications of the VMs that are to be launched at a higher level to a lower level hypervisor.

In the scenario with n virtualization levels, n−2 levels are needed to implement the software extensions. In other words, the source code of n−2 hypervisors must be modified. The additional overhead introduced and the persistence switches and interactions between the different levels and modes of operation can adversely affect system performance.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

A method of handling an event occurring in a nested virtualization computing environment is provided, wherein N hypervisors are executed nestedly, with a first hypervisor running at level zero (L0) directly over a host machine, and other hypervisors nestedly running at levels L1 to Ln, respectively. The method comprises trapping an event generated by software running at level Ln; determining a hypervisor x at level Lx designated for handling the trapped event; and wherein the hypervisor x emulates features needed for performing the trapped event for the software running at the level Ln.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1A:
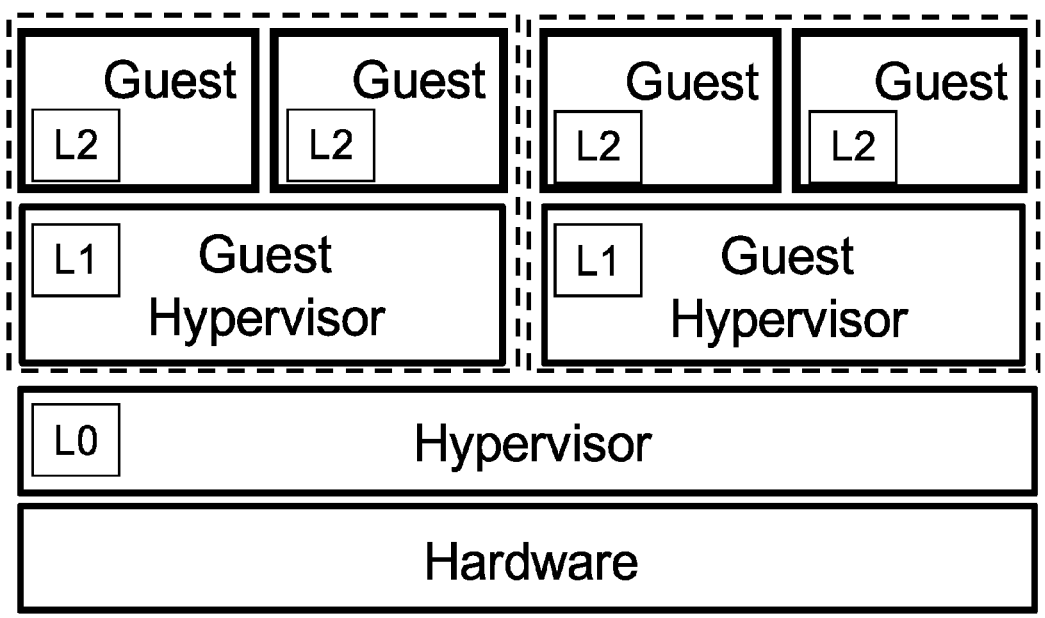
FIGS. 1A and 1B are diagrams of exemplary nested virtualization environments and the path of execution among the nested levels in such example embodiments.
Figure 1B:
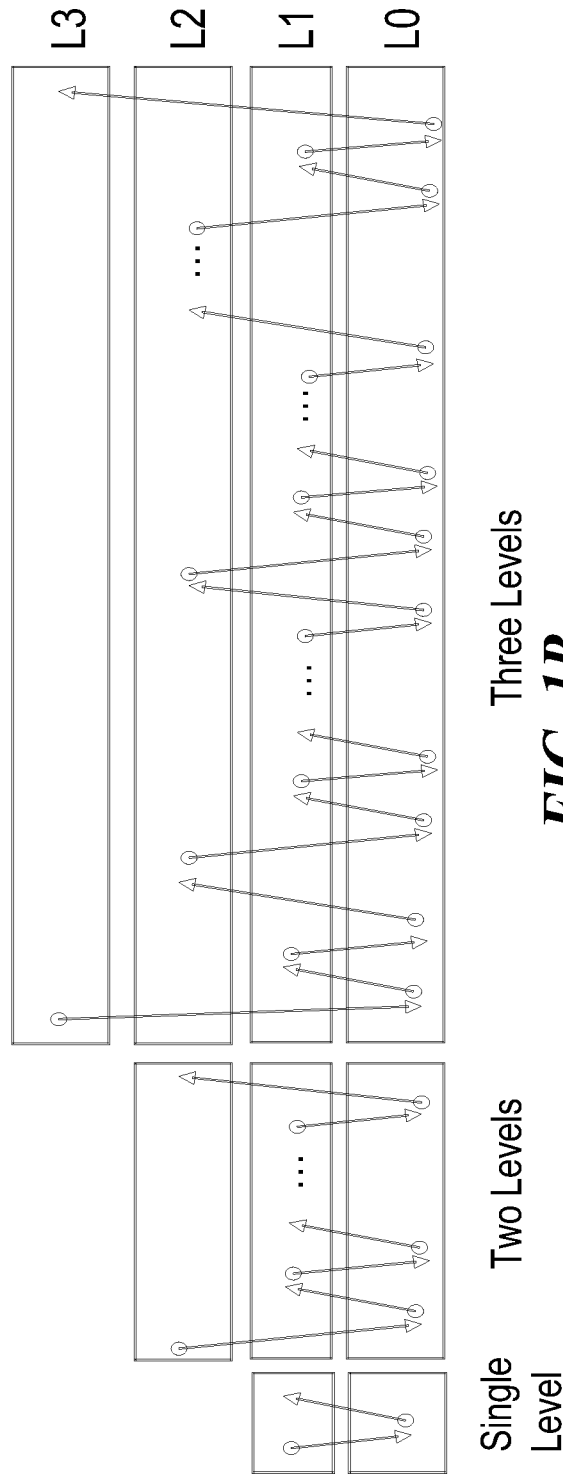
Figure 2A:
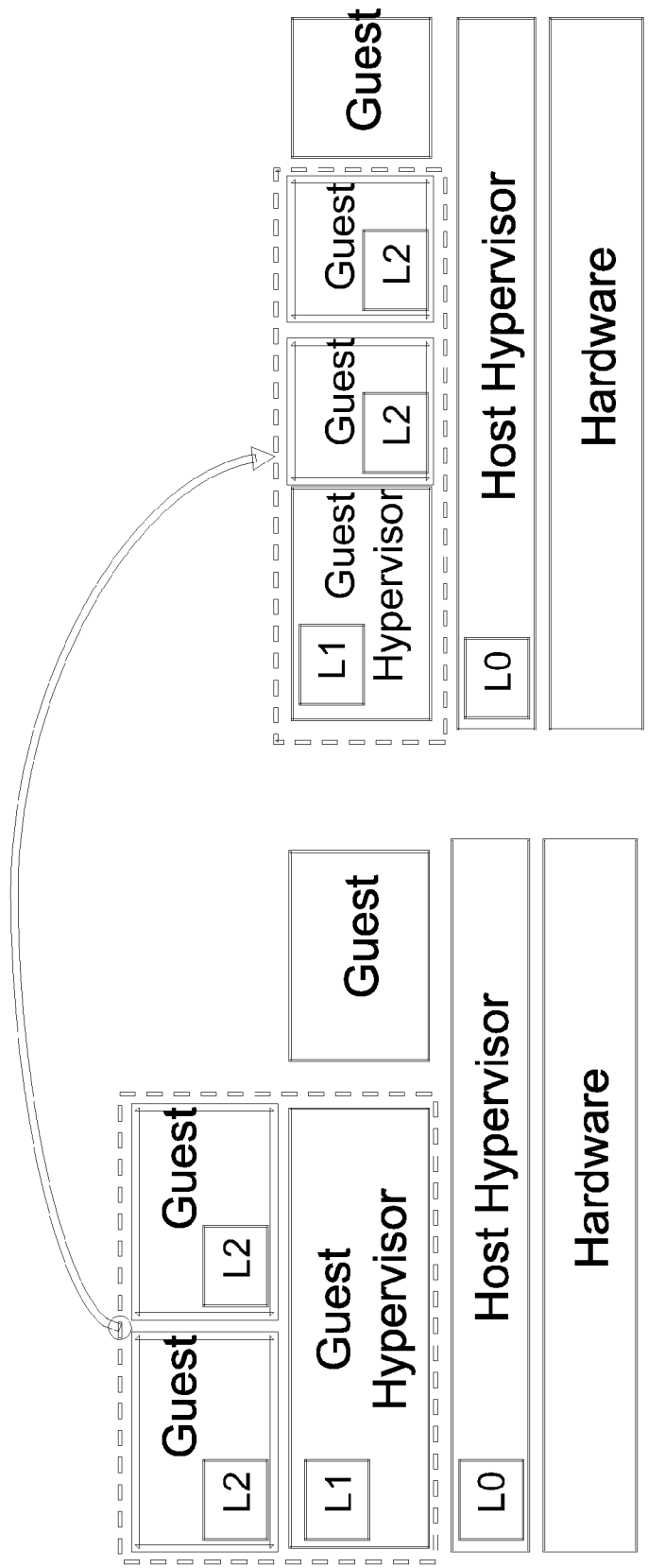
FIGS. 2A and 2B are block diagrams of a virtualization environment in which the nested virtualized levels are multiplexed over the based virtualization level, in accordance with one embodiment.
Figure 2B:
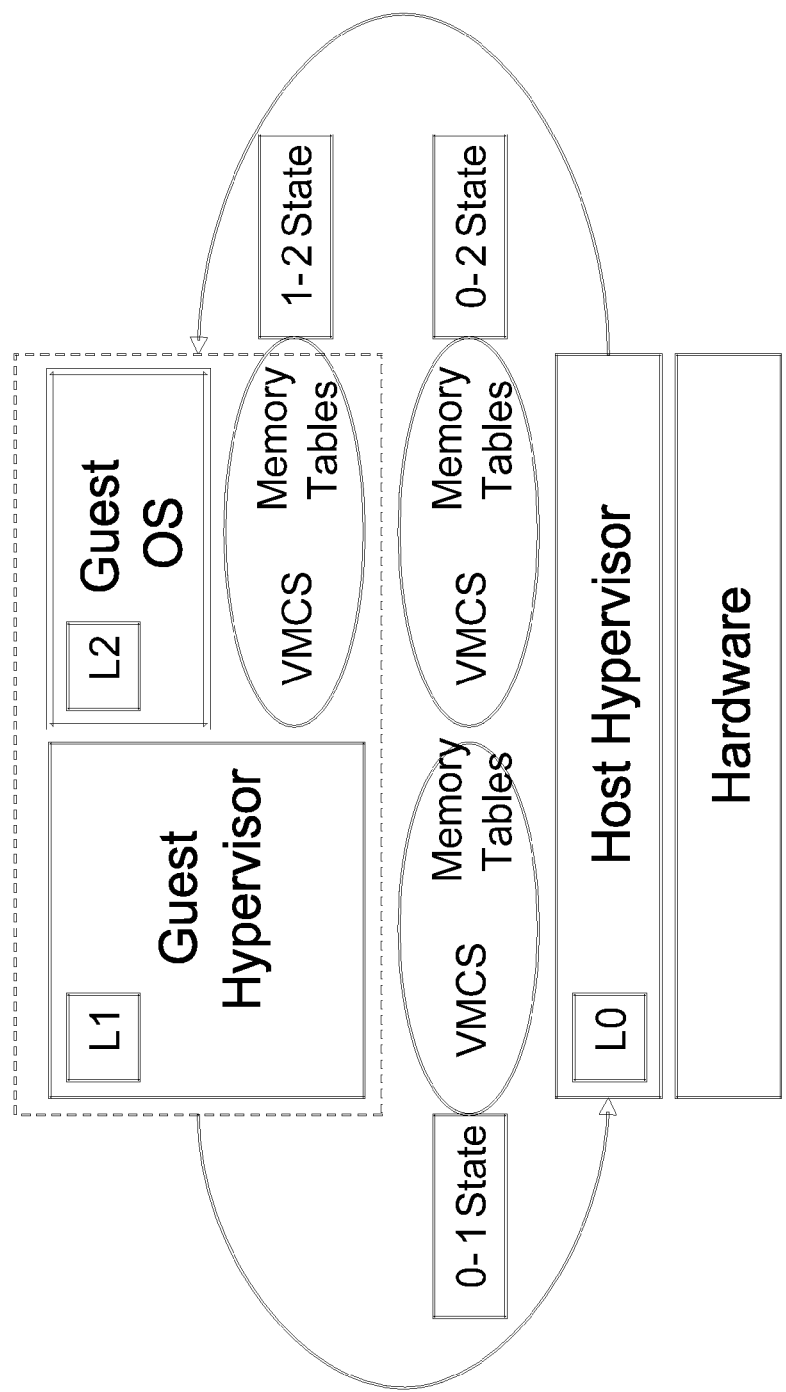

Referring to FIGS. 2A and 2B, in one embodiment, a multiplexing approach may be implemented, such that multiple levels of virtualization (e.g., multiple hypervisors and VMs) are supported on a single level virtualization. In this multiplexing scheme, traps are forwarded by L0 hypervisor between the different levels. For example, when L1 wishes to run a VM at L2 level, L1 launches the VM. This causes a trap to L0 because L1 is not operating at root mode.

As shown in FIG. 2B, L1 supplies L0 with the VM specifications (e.g., the memory tables, the instruction pointers, VM states, etc.) that are to be used by L0 to launch the VM at L2. In some embodiments, the VM specification also includes VM entries and VM exits that are managed by data structures called the virtual-machine control structure (VMCS) or virtual-machine control block (VMCB). L0 may not understand the specifications of the VM because those specifications are generated within the context of the L1 environment (e.g., the L2's state viewed from the L1's perspective, shown as 1-2 state). Therefore, the L1 specification of the VM at L2 is translated by L0 into a L0 context specification. That is, the translated specification is generated so that it can be used to run VM at the L2 level.

The above translation process may include converting memory addresses from L1's physical address space to L0's physical address space and so on. Accordingly, L0 may multiplex the hardware between L1 and L2 levels, where both a guest hypervisor and a guest VM can run as L0 VMs. When n levels of nesting are present, multiple virtualization levels may need to be multiplexed. To avoid the overhead associated with multiplexing the multiple levels (e.g., n levels), a mechanism may be implemented to support multilevel nested virtualization, where the L0 hypervisor has software extensions which transparently add nested support for the other levels, so that the hypervisors running at the higher levels may remain unmodified.

Figure 3A:
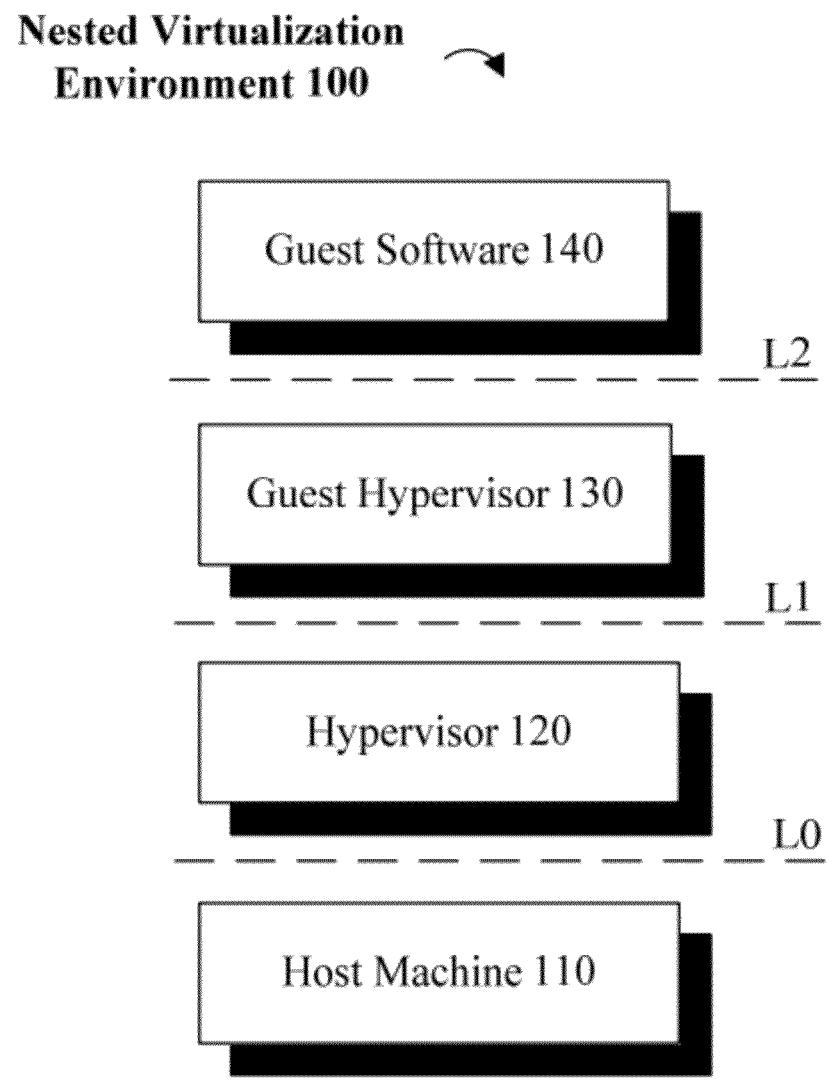
FIG. 3A is an exemplary block diagram of a virtualized computing environment with nested hosting levels, in accordance with one embodiment.

Referring to FIG. 3A, in accordance with one embodiment, an exemplary nested virtualization environment 100 comprises a host machine 110 and three levels of virtualization. The root level (L0) comprises a base hypervisor 120; L1 comprises a guest hypervisor 130; and L2 comprises a guest software 140. The L0 hypervisor 120 runs directly on the host machine 110 physical hardware and implements a VM for the L1 guest hypervisor 130. The L1 guest hypervisor 130 runs on the L0 hypervisor 120 and implements a VM for the L2 guest 140.

The L1 guest hypervisor 130 and the L2 guest 140 may each be launched with a set of specifications that define one or more virtualization features. Each of the features may be supported through hardware (e.g., the host machine 110) or software (e.g., the underlying host hypervisor). In one implementation, the host machine 110 architecture may be virtualized using a trap-and-emulate model, in which when guest software 140 tries to execute a sensitive instruction, the execution traps to the guest hypervisor 130 which emulates the instruction and resumes the guest execution.

In the exemplary nested virtualization environment 100, with multiple levels (L0, L1, L2), a sensitive instruction executed at the highest level (L2) will trap to lowest level (L0) because the host machine 100 architecture limitations do not permit to trap from L2 to L1. L0 is responsible for forwarding any trap, caused by L2 to the handling level, L1. If L1 does not include software extensions for nested virtualization, L2 will fail to host a new level L3 using hardware support because the virtualization instructions are not emulated by L1.

As such, in one embodiment, L2 virtualization instructions are trapped and emulated at L0, and L1 is bypassed. In this example, from within the context of L1, L1 will be running a single L2 VM and there is no L3 level. Meanwhile, within L2 context, L2 will be running on top of the host machine 110 with its own VM at L3. The limited exemplary scenario with three nested virtualization levels provides a general understanding of the proposed concepts and implementations for one or more embodiments.

In the following, a more global application of the same or similar principles as applied to n nested virtualization levels as provided in further detail. More broadly stated, if there are K VMs running at each level, then for example, L0 may host K guest hypervisors at L1, L1-1, L1-2, . . . , L1-K such that each L1-K, can host Q guests at L2: L1-K-1, L1-K-2 . . . L1-K-Q and so on so that at any level there might be multiple guests or guests hypervisors.

In one embodiment, the system architecture is configured to expose hardware virtualization capabilities at multiple levels and desirably at all levels. For example, level Ln−1 may need to use hardware virtualization extensions to create a new level (Ln), when Ln−2 does not include the requisite extensions to handle a trap at Ln−1. To accomplish this, we need to expose to Ln−1 the hardware virtualization capabilities, even if Ln−2 does not do that. These capabilities may be exposed using trappable instructions and registers of the processor in the host machine 110.

When a trap occurs, the processor passes control to the lowest level hypervisor (e.g., the L0 hypervisor). The L0 hypervisor emulates a processor with hardware virtualization capabilities for Ln−1 and returns control to level Ln−1. L0 hypervisor depending on implementation will expose the same capabilities that Ln−2 exposes to Ln−1, with the addition of the hardware virtualization extensions. For example, referring to FIG. 3A, L1 guest hypervisor 130 may not be able to expose hardware virtualization capabilities to L2 guest software 140. However, L0 hypervisor is configured to expose the hardware virtualization capabilities to L2 guest software 130, even if L1 cannot.

In one embodiment, the processor architecture is configured to add a dedicated structure shared by the hypervisor and the processor to define the specifications needed to run a VM. In particular, the hypervisor configures the specifications with a list of the trapped events. In the scenario with a single virtualization level, the events are trapped by L0 for handling and emulation. Then, L0 modifies the L1 state and resumes it. In the scenario with two virtualization levels, the handling path depends on which level caused the event. If the event was caused by L1, then L0 handles it similarly to the single virtualization level case. When the event is caused by L2, then L0 usually forwards it to L1 for handling.

Accordingly, L0 exposes virtualization capabilities to L2. When L2 tries to launch a new level, L3, this will cause a trapped event and control is returned to L0. In one embodiment, L0 forwards the event to L2, bypassing L1, if L1 does not support nested virtualization extensions. L2 then handles the event, prepares the L3 specifications and launches L3. The launch instruction will cause a trap to L0, which merges the VM specifications across the nested levels and runs the new level, L3.

In one implementation, if L3 generates a sensitive event that is to be handled by L1, the sensitive event is forwarded from L0 to L1, if L1 supports nested virtualization. But if L1 does not support nested virtualization then L0 forwards the trapped event to L2. L0, L1, L2 designate which events they will trap for L3. For example, L1 may trap an event X and L2 may not. If L3 generates the event X, L1 has no knowledge of L3, so event X is transformed so that L1 thinks X is generated for L2.

When a trapped event occurs while L3 is running, the processor passes the control to L0. Depending on the specifications for each level, L0 may handle the trap differently. For example, if L2 specified to trap the event, the trap is forwarded to L2. If, however, L1 specified to trap the event but L2 didn't, then the trap is transformed to a trap caused by L2 and then forwarded to L1. When L1 finishes the handling and asks to resume L2, L0 will transform the L2 resume to a L3 resume. If no level is designated to handle a trap then the trap is handled by L0.

Advantageously, using the above mechanism, when a trapped event occurs, the instruction causing it is not executed by the processor. This means that no event has happened and that from L1's perspective, L3 didn't change any privileged state. L2 may cause a new trapped event when L2 emulates the instruction for L3. Thus, this new trapped event will be handled by L1 for L2, without L1 being aware of L3 (Note: L2 is aware of L3; L1 is aware of L2; L1 is not aware of L3; L2 is not aware of L1).

Figure 3B:
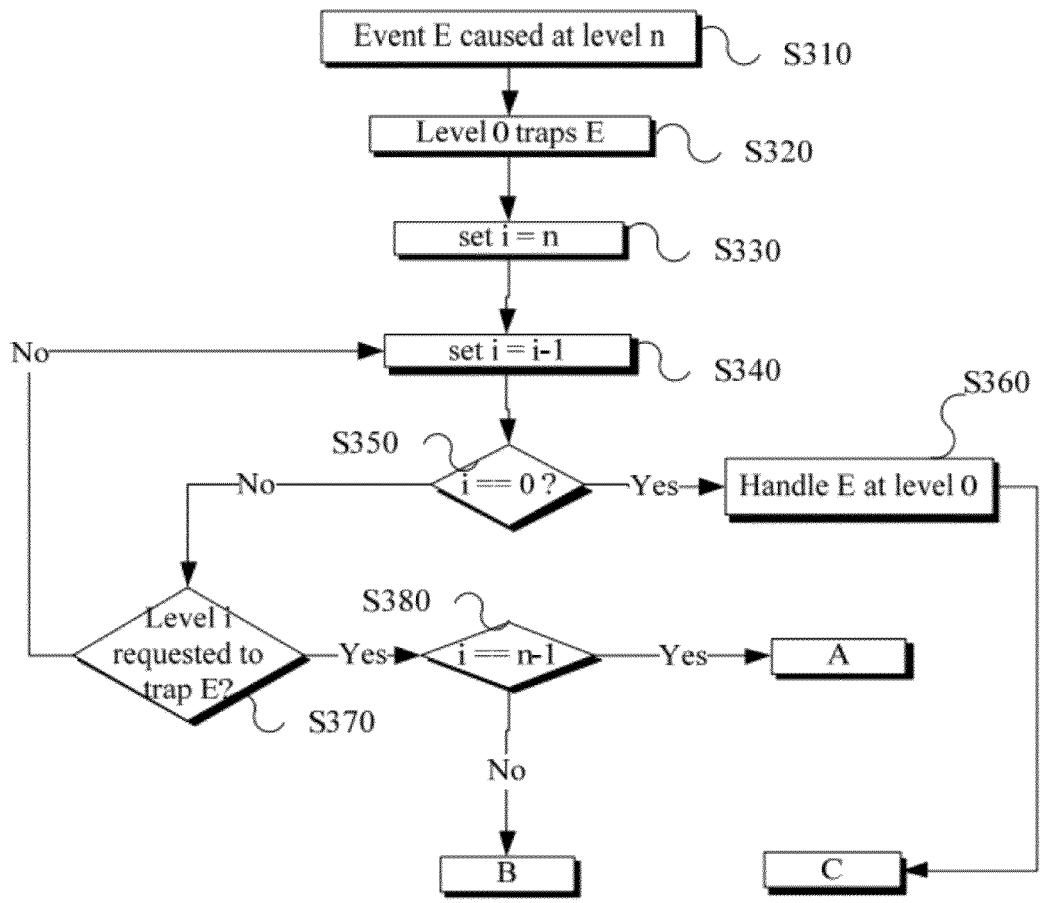
FIGS. 3B and 3C are exemplary flow diagrams of a method for virtualizing a computing environment with nested hosting levels, in accordance with one embodiment.
Figure 3C:
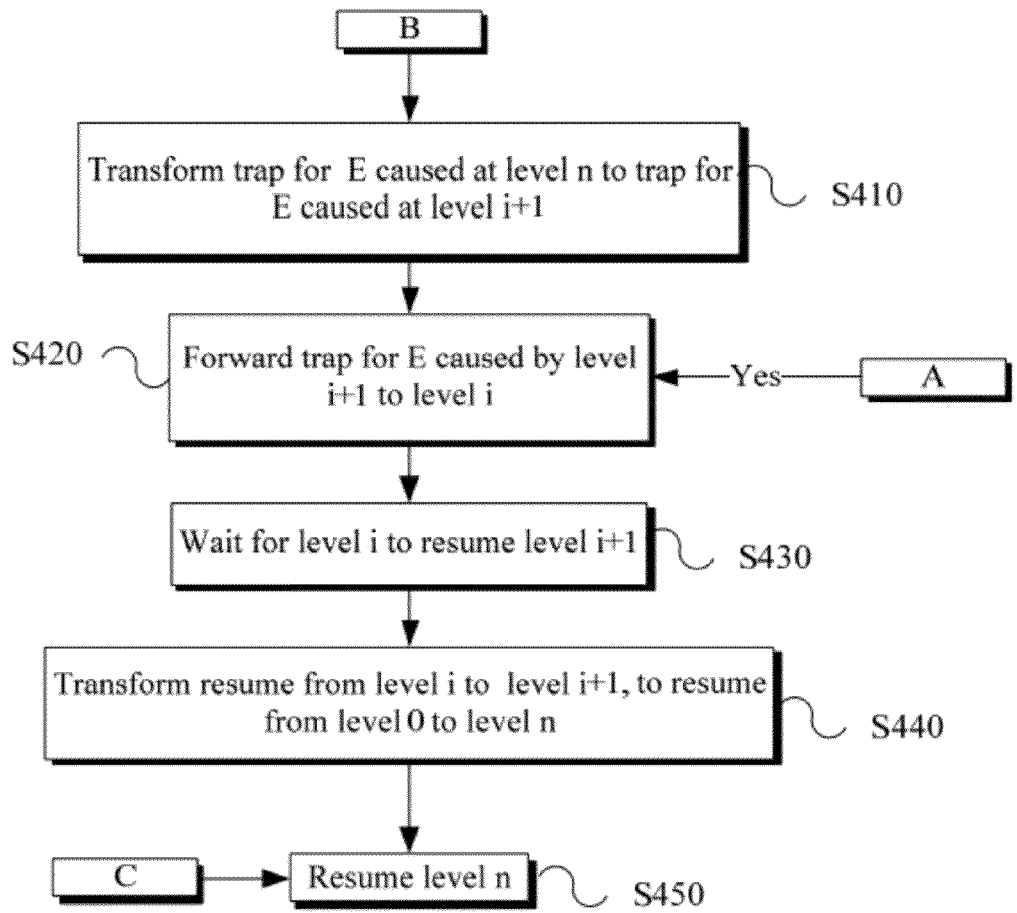

Referring to FIGS. 3B and 3C, the following method may be applicable to a nested virtualization environment with n nested levels, where event E is caused at level n (S310), and L0 traps E (S320):

(1) Look for the highest level below the level causing the trap (Lh=the handling level, H=Max(i=0 to N−1|when Li specified to trap E)

In other words, a look up process is initiated and completed (see S330 to S370), where it is determined if Ln−1 has requested for event E to be trapped, if not then it is determined if Ln−2, Ln−3, ..., L0 has made the request until L0 is reached, unless it is determined that some level asked to trap the event E, wherein $0 \leq i \leq n$;

It is then determined at each level whether that level request to trap the event E, according to a decreasing variable "i" that starts from n−1 and ends when a level i is found that has asked to trap the event E or it ends when i is 0 (S370). Thus, the loop repeats the steps S340, S350, S370 until one of the conditions (S350 or S370) is true.

(2) if Li==Ln−1 (the lookup loop ends at S380 and the method proceeds to A)
   (2.1) forward the trap for E caused by Li+1 to Li (S420)
   (2.2) when Ln−1=Li resumes Ln=Li+1 (S430), transform it to a resume from L0 to Ln=Li+1(S440), and resume Ln=Li+1 (S450)

(3) If 0<Li<Ln−1 (the lookup loop ends at S380 and the method proceeds to B)
   (3.1) transform the trapped event (e) from Ln to a new trapped event (e') caused by Li+1 (S410)
   (3.2) forward the transformed event e' to Li (3.3) when Li resumes Li+1 (S430), transforms it to a resume of Ln (S440) and resume Ln (S450)

(4) If Li==L0 ((the lookup loop ends at S350 and the method proceeds to S360)
   (4.1) handle the event E at L0 (S360)
   (4.2) resume Ln (S450)

In one embodiment, the virtual machine specifications for multiple virtualization levels may be merged by way of a VMCS shadowing process disclosed in the publication entitled "The Turtles Project: Design and Implementation of Nested Virtualization," Ben-Yehuda, et. al., (Jan. 9, 2010), the entire content of which is incorporated herein by reference. When more than two nested virtualization levels are present, the VMCS shadowing process is applied for the additional levels to obtain the lowest level specifications used by the CPU. For example, assume we have VMS(x, x+1), the virtual machine specifications created by Lx to run Lx+1. The VMS (0, x+1) created by L0 to run Lx will be a calculated by: VMS01 [merge] VMS12 [merge] VMS23 [merge] VMS(x−1, x) [merge] VMS(x, x+1).

In one embodiment, when a trap caused by Ln is forwarded to Lh, (e.g., when $0 \leq h \leq n-1$), we transform the trap as it was caused by Lh+1 because Lh is not aware of any level above Lh+1. The information for the trap caused by Ln is written by the CPU into VMSON, the virtual machine specification created by L0 to run Ln. In addition, Lh creates the specifications VMS(h, h+1) to run Lh+1. L0 modifies VMS(h,h+1) according to the changes made by the CPU into VMS(0, n). Then, L0 resumes Lh which will believe that trap was caused by Lh+1.

Depending on implementation, after a trap caused by Ln is transformed to a Lh+1 trap and forwarded to Lh, L0 will take control when Lh tries to resumes Lh+1. L0 analyzes the changes made by Lh into VMS(h,h+1) and propagate them into all the specifications VMS0Y above Lh+1 (when $h+1 \leq y \leq n$). Finally, L0 resumes Ln instead of Lh+1.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4:
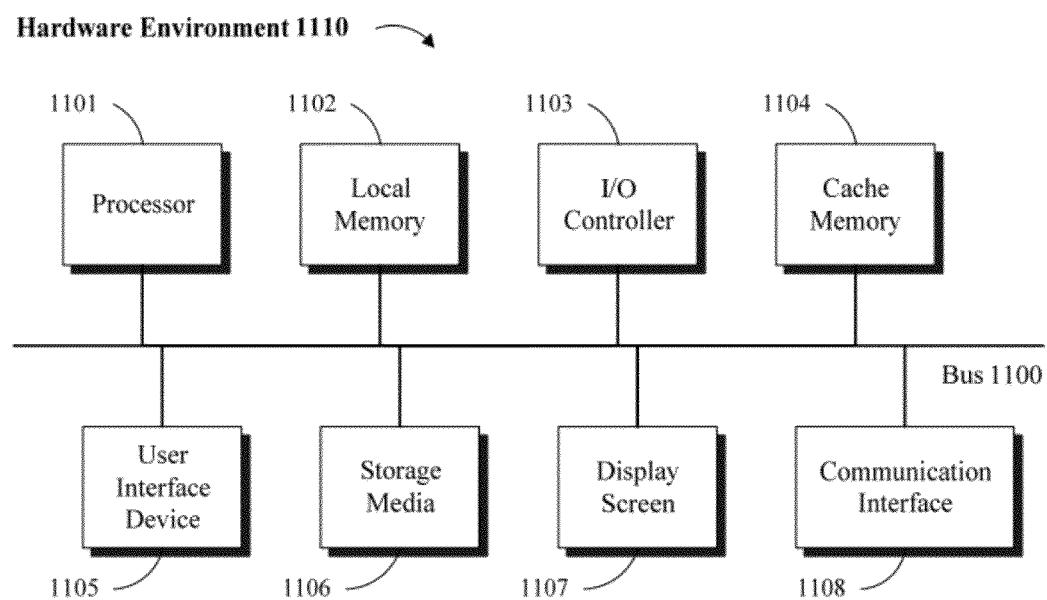
FIGS. 4 and 5 are diagrams of hardware and software environments in which a system of the present invention may operate, in accordance with one or more embodiments.
Figure 5:
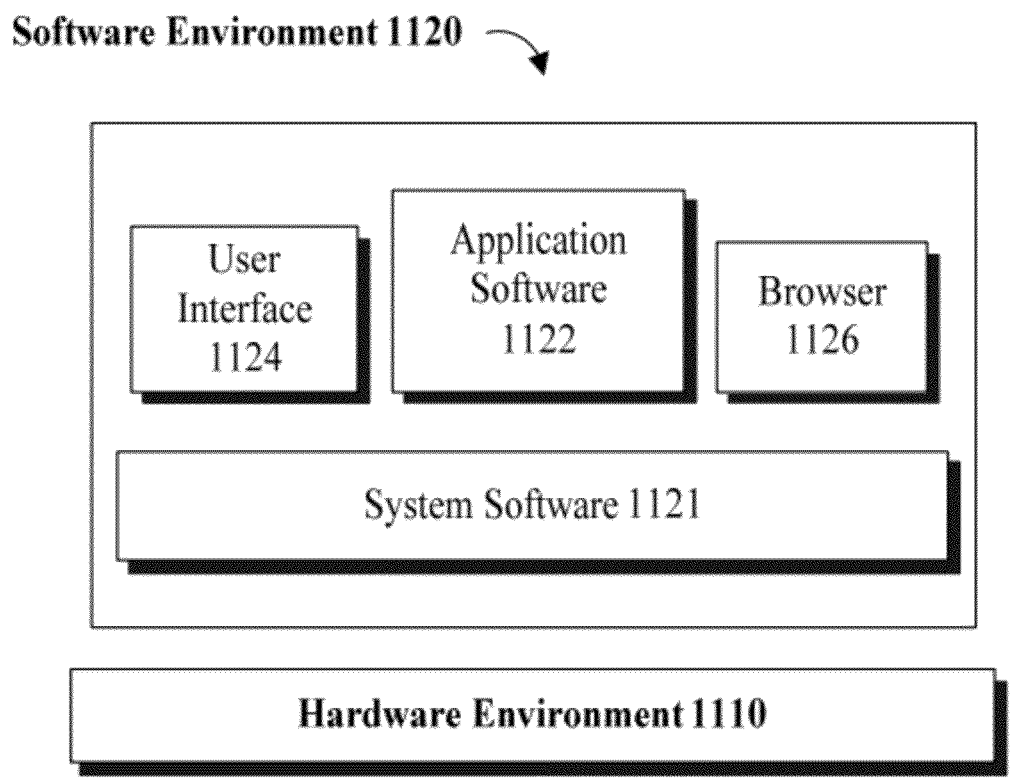

Referring to FIGS. 4 and 5, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 5, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method of handling an event occurring in a nested virtualization computing environment, wherein a plurality of hypervisors are executed nestedly, with a first hypervisor running at level zero (L0) directly over a host machine, and other hypervisors nestedly running at levels L1 to Ln, respectively, the method comprising:

trapping at level L0 an event generated by software running at level Ln, wherein the event is a privileged instruction;

determining whether a hypervisor running at level Lx is configured for handling the event, wherein Lx is a level between L0 and Ln;

handling the event by the first hypervisor running at level L0, if no other hypervisors running at levels L1 to $L_{n-1}$ are configured for handling the event;

wherein in response to determining that the hypervisor running at level Lx is configured for handling the event, the hypervisor running at level Lx emulates features needed for performing the event and wherein in response to the emulation, the first hypervisor running at level L0 propagates the emulated features at level Lx to apply to levels Lx+1 through Ln, and transforming the event, generated at level Ln and trapped at level L0, as if the event was caused by a software running at level $L_{x+1}$ so that the event is handled by hypervisor running at level Lx; and resuming, by the first hypervisor at level L0, the software running at level Ln.

2. The method of claim 1, wherein the hypervisor running at level Lx is among a group of one or more hypervisors running at levels 0 to n designated for handling the event generated at level Ln and trapped at level L0.

3. The method of claim 2, wherein the hypervisor running at level Lx is the highest ranking hypervisor in said group.

4. A computer-implemented system for handling an event occurring in a nested virtualization computing environment, wherein a plurality of hypervisors are executed nestedly, with a first hypervisor running at level zero (L0) directly over a host machine, and other hypervisors nestedly running at levels L1 to Ln, respectively, the system comprising:

- one or more processors for supporting execution of a plurality of hypervisors running at levels L1 to Ln;
- a logic unit for trapping, at level L0, an event generated by software running at level Ln, wherein the event is a privileged instruction;
- a logic unit for determining whether a hypervisor running at level Lx is configured for handling the event, generated at level Ln and trapped at level L0, wherein Lx is a level between L0 and Ln;
- a logic unit for handling the event, by the first hypervisor running at level L0, if no other hypervisors running at levels L1 to $L_{n-1}$ are configured for handling the event;
- wherein in response to determining that the hypervisor running at level Lx is configured for handling the event, the hypervisor running at level Lx emulates features needed for performing the event and
- wherein in response to the emulation, the first hypervisor running at level L0 propagates the emulated features at level Lx to apply to levels Lx+1 through Ln, and
- a logic unit for transforming the event, generated at level Ln and trapped at level L0, as if the event was caused by a software running at level $L_{x+1}$ so that the event is handled by hypervisor x at level Lx; and
- a logic unit for resuming, by the first hypervisor at level L0, the software running at level Ln.

5. A non-transitory computer readable storage medium for storing logic code executable on a computing machine, wherein execution of the logic code causes the computing machine to:

- trap, at level L0, an event generated by software running at level Ln, wherein the event is a privileged instruction;
- determine whether a hypervisor running at level Lx is configured for handling the event, wherein Lx is a level between L0 and Ln;
- handle the event, by the first hypervisor running at level L0, if no other hypervisors running at levels L1 to $L_{n-1}$ are configured for handling the event;
- wherein in response to determining that the hypervisor running at level Lx is configured for handling the event, the hypervisor running at level Lx emulates features needed for performing the event and in response to the emulation the first hypervisor running at level L0 propagates the emulated features at level Lx to apply to levels Lx+1 through Ln, and
- transform the event, generated at level Ln and trapped at level L0, as if the event was caused by a software running at level $L_{x+1}$ so that the event is handled by the hypervisor running at level Lx; and
- resume, by the first hypervisor at level L0, the software running at level Ln.

* * * * *